United States Patent [19]

Satomi et al.

[11] 4,378,859
[45] Apr. 5, 1983

[54] SILENCER FOR INTAKE/EXHAUST GAS DUCT

[75] Inventors: Seigo Satomi; Masanosuke Ikai, both of Nagoya, Japan

[73] Assignee: NGK Insulators, Ltd., Nagoya, Japan

[21] Appl. No.: 271,100

[22] Filed: Jun. 8, 1981

[30] Foreign Application Priority Data

Dec. 13, 1979 [JP] Japan .................. 54-172822

[51] Int. Cl.³ .................... E04F 17/04; F01N 1/02
[52] U.S. Cl. .................... 181/224; 181/250; 181/251; 181/252
[58] Field of Search ............... 181/213, 214, 222, 224, 181/229, 248, 250, 251, 252, 256, 257, 268

[56] References Cited

U.S. PATENT DOCUMENTS 2,308,886  1/1943  Mason .............................. 181/224
2,950,776  8/1960  Stephens ........................... 181/224
3,018,840  1/1962  Bourne et al. ..................... 181/224
4,236,597 12/1980  Kiss et al. ......................... 181/224

Primary Examiner—L. T. Hix
Assistant Examiner—Thomas H. Tarcza
Attorney, Agent, or Firm—Stevens, Davis, Miller & Mosher

[57] ABSTRACT

The disclosed silencer has noise-absorbing partitions disposed in a gas duct in parallel with but with a spacing from outer walls of the duct, so as to define gas passage means and noise-absorbing space means in the duct. The noise-absorbing space means is closed by noise-shielding plates at inlet and outlet ends of the duct. A plurality of gas chambers aligned along the line of gas flow through the duct are formed in said noise-absorbing space means by disposing noise-shielding sectional walls therein.

4 Claims, 6 Drawing Figures

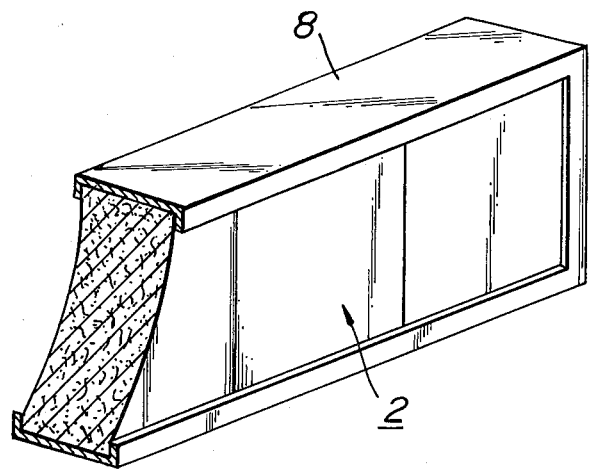
FIG_5
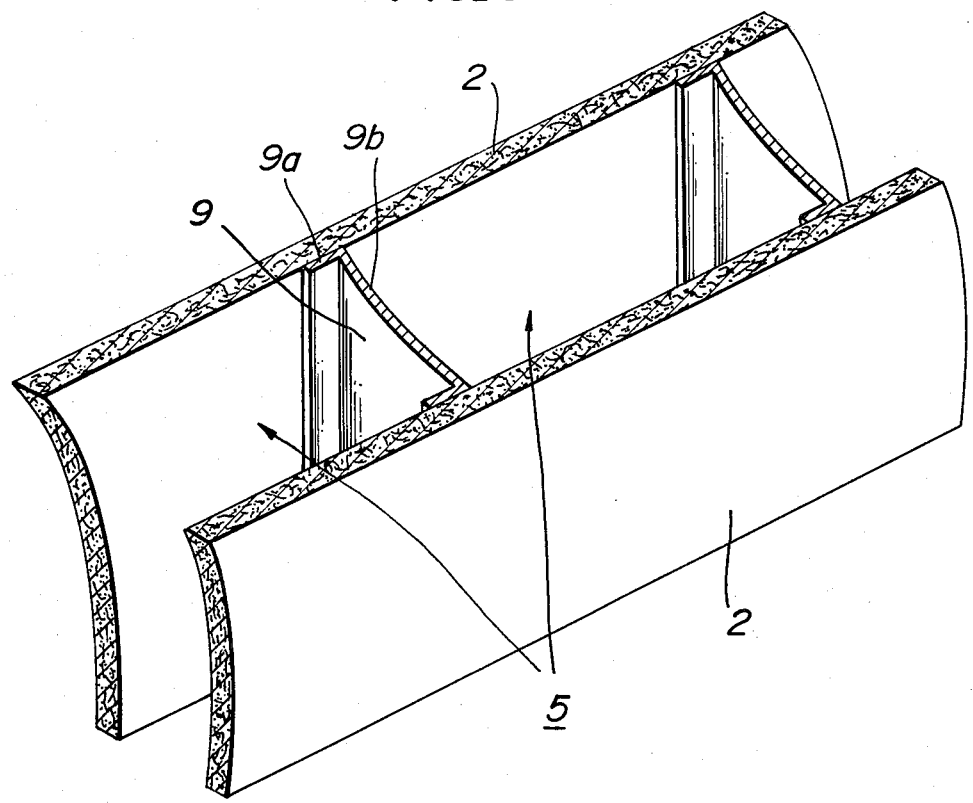
FIG_6

SILENCER FOR INTAKE/EXHAUST GAS DUCT

BACKGROUND OF THE INVENTION

1. Field of the Invention

This invention relates to a silencer for intake/exhaust gas duct for suppressing noise of intake or exhaust gas flow.

More particularly, the invention relates to a silencer which is specially suitable for noise suppression of gas (including air) flow at a high temperature, at a high flow rate, or containing corrosive ingredients or dust particles.

2. Description of the Prior Art

Heretofore, a silencer to be incorporated in an intake gas duct or an exhaust gas duct has been made by disposing noise-absorbing partitions such as porous noise-absorbing plates or fibrous felt plates in the gas duct so as to form a gas passage surrounded by the noise-absorbing partitions and a noise-absorbing gas chamber adjacent the gas passage. The silencers of the prior art are available in cell type or split type.

The silencer of the cell or split type of the prior art has shortcoming in that the noise-absorbing gas chamber thereof is continuous from inlet of the gas duct to the outlet thereof, so that satisfactory noise suppression cannot be obtained.

SUMMARY OF THE INVENTION

Therefore, an object of the present invention is to obviate the aforesaid shortcoming of the prior art by providing an improved silencer.

In a preferred embodiment of the invention, inside space of a gas duct, such as an intake or exhaust gas duct, is divided into a noise-absorbing space and a gas passage by disposing noise-absorbing partition means in the gas duct, and the noise-absorbing space is closed by noise-shielding plates secured to the inlet and outlet ends of the gas duct and is divided into a plurality of gas chambers by noise-shielding sectional walls disposed therein, so that excellent noise suppression is achieved by resonant noise-absorbing effects of the thus divided gas chambers.

Another object of the present invention is to provide a corrosion-resistant silencer by using porous ceramic plates as the noise-absorbing partition to separate the noise-absorbing space from the gas passage. The noise-absorbing partition made of porous ceramic plate provides a highly durable silencer.

In another embodiment of the present invention, formed metal sections are used both as members of structural skeleton and as the noise-shielding sectional walls to divide the noise-absorbing space of the silencer into a plurality of gas chambers, so that the silencer can be constructed very easily.

BRIEF DESCRIPTION OF THE DRAWINGS

For a better understanding of the invention, reference is made to the accompanying drawings, in which:

FIG. 5 is a fragmentary perspective view of a unit panel made by assembling preformed ceramic plates to form a noise-absorbing partition; and FIG. 6 is a fragmentary perspective view of a noise-absorbing space, showing the relationship between noise-absorbing partitions and preformed metal sections acting both as skeleton members and as noise-shielding sectional walls for defining gas chambers.

Throughout different views of the drawings, 1 is a duct, 2 is a noise-absorbing partition, 3 is a gas passage, 4 is a noise-shielding plate, 5 is a noise-absorbing space, 5a through 5z are gas chambers, 6 is a noise-shielding sectional wall, 7 is a noise-shielding partition, 8 is a frame member, and 9 is a formed metal section.

DESCRIPTION OF THE PREFERRED EMBODIMENTS

Figure 1:
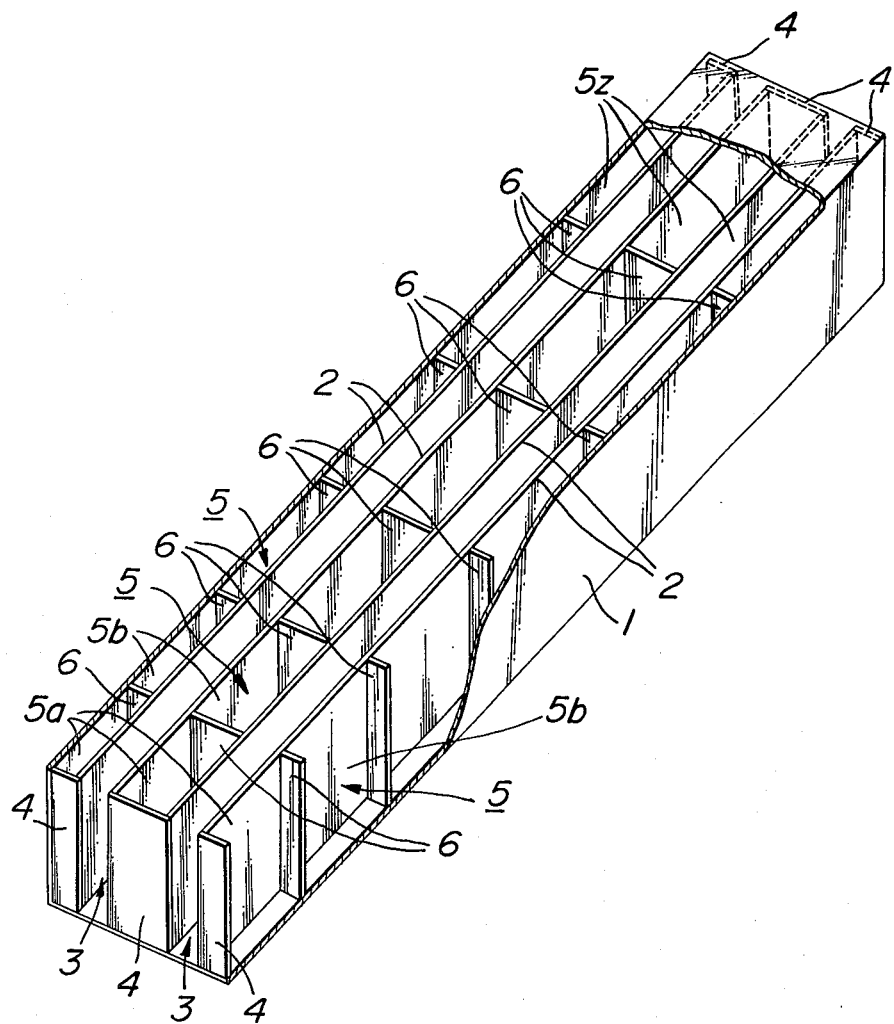
FIG. 1 is a partially cutaway perspective view of a first embodiment of the present invention, wherein two gas passages are formed, each of which is positioned between noise-absorbing spaces.

FIG. 1 shows a split type silencer as a first embodiment of the present invention. A duct 1 is formed by casing wall with suitable strength and noise-absorbing capability, such as wall made of metal, asbestos slate, or concrete. The duct 1 is for instance a gas feeding duct, a gas exhaust duct, or a gas duct to carry flow of various kinds of gas. Noise-absorbing partitions 2 extend in the duct 1 along the direction of gas flow therein so as to define a plurality of gas passages 3 and a plurality of noise-absorbing spaces 5 therein. Each gas passage 3 extends through the duct 1 and has open ends at the inlet and outlet of the duct 1. Opposite ends of each noise-absorbing space 5 are closed by noise-shielding plates 4, 4 at inlet and outlet of the duct 1. Each noise-absorbing partition 2 has continuous minute holes extending across the thickness thereof and is made of for instance porous ceramic plates, porous synthetic resin plates, or fibrous plates. Each noise-absorbing space 5 is divided by a plurality of noise-shielding sectional walls 6 into a plurality of gas chambers 5a, 5b, . . . , 5z, which gas chambers are aligned along the line of gas flow through the duct 1. Preferably, the noise-shielding sectional walls 6 are disposed in such a manner that the lengths of the gas chambers 5a, 5b, . . . , 5z increase as the duct 1 extends from the inlet end to the outlet end thereof, with the shortest gas chamber 5a at the inlet end and the longest gas chamber 5z at the outlet end thereof.

Figure 2:
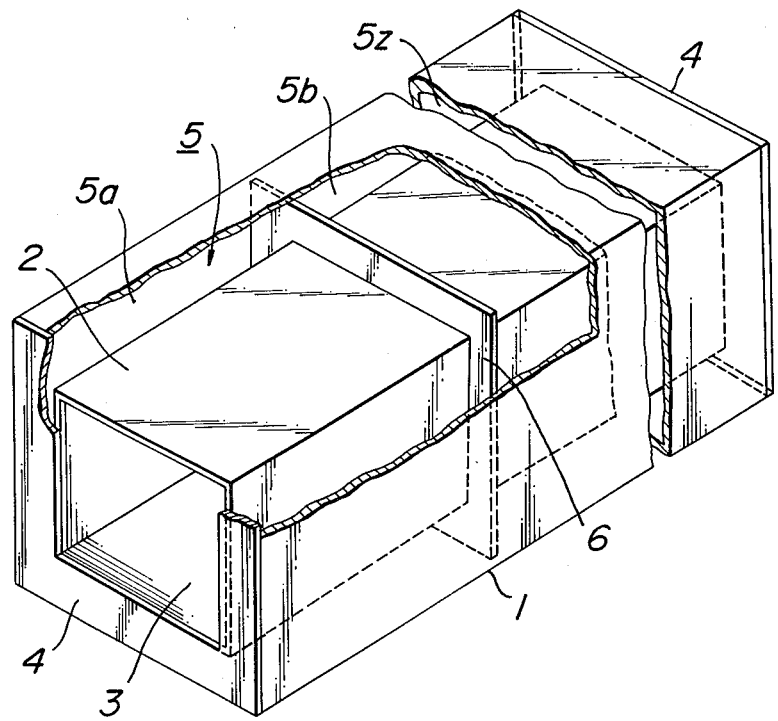
FIG. 2 is a partially cutaway perspective view of a second embodiment of the present invention, wherein only one gas passage is formed which is surrounded by a noise-absorbing space.
Figure 3:
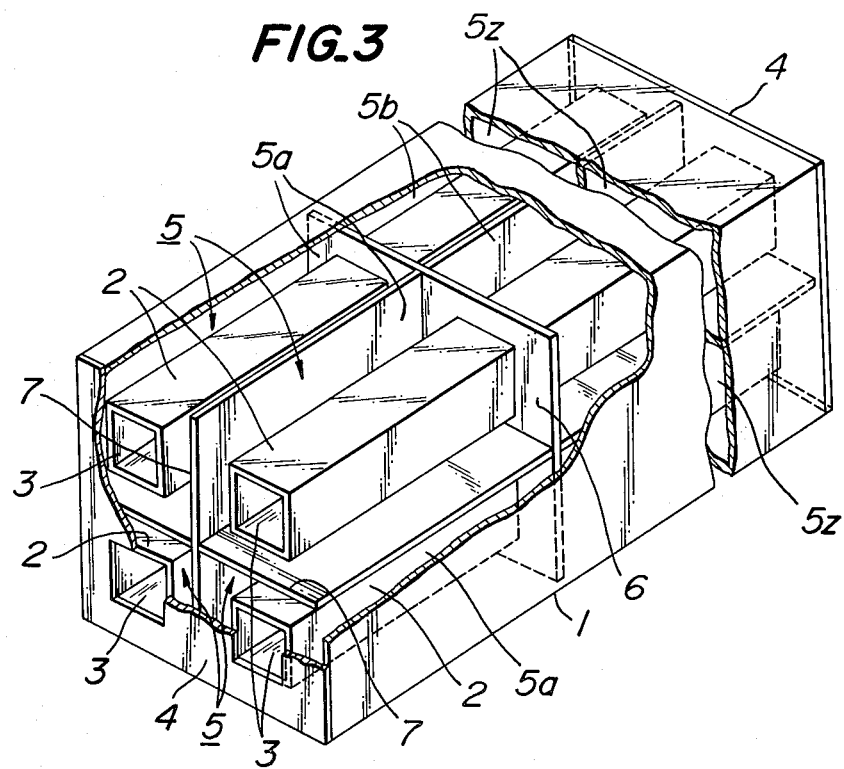
FIG. 3 is a partially cutaway perspective view of a third embodiment of the present invention, wherein four gas passages are formed, each of which is surrounded by a corresponding noise-absorbing space.

FIGS. 2 and 3 show cell type silencers according to the present invention. In the second embodiment of the present invention as shown in FIG. 2, a tubular noise-absorbing partition 2 with a hollow rectangular cross section is formed through the central portion of a duct 1 so as to extend along the line of gas flow therethrough. Accordingly, a gas passage 3 is formed in the noise-absorbing partition 2, which gas passage 3 has open ends at the inlet and outlet of the duct 1. The interspaces between the casing wall of the duct 1 and the noise-absorbing partition 2 are closed by noise-shielding plates 4, 4 at the inlet and the outlet of the duct 1, so as to form a noise-absorbing space 5. The noise-absorbing space 5 is divided by noise-shielding sectional walls 6 into a plurality of gas chambers 5a, 5b, . . . , 5z disposed along the line of gas flow through the duct 1.

In the third embodiment of the invention as shown in FIG. 3, two crossed noise-absorbing partitions 7, 7 are disposed through the central portion of a duct 1 so as to extend along the line of gas flow therethrough. Whereby, four sectionalized portions are formed in the duct 1, each of which sectionalized portions extends through the entire length of the duct 1. A tubular noise-absorbing partition 2 with a hollow rectangular cross section is formed along longitudinal central axis of each sectionalized portion so as to extend along the line of gas flow through the duct 1. Accordingly, a gas passage 3 is formed in each noise-absorbing partition 2, which gas passage 3 has open ends at the inlet and outlet of the duct 1. Interspaces between the casing wall of the duct 1 and the noise-absorbing partitions 2 and between the noise-shielding partitions 7 and the noise-absorbing partitions 2 are closed by noise-shielding plates 4, 4 at the inlet and outlet of the duct 1, so as to form noise-absorbing spaces 5 at the interspaces. Noise-shielding sectional walls 6 are disposed in each of the noise-absorbing spaces 5, so that each noise-absorbing space 5 is divided into a plurality of gas chambers $5a$, $5b$, ..., $5z$ disposed along the line of gas flow through the gas duct 1 as in the case of the preceding embodiments of FIGS. 1 and 2.

In operation, the silencer of the invention with the aforesaid construction can be used in gas ducts connected to blowers or exhaust gas systems in a manner similar to that of silencers of the prior art. Gas entering at the inlet of the duct 1 flows through the gas passage 3, because the noise-absorbing space 5 separated from the gas passage 3 by the noise-absorbing partition 2 is closed by the noise-shielding plate 4. At least a major portion of the sidewall of the gas passage 3 is made of the noise-absorbing partition 2 which is a porous ceramic plate or the like with minute continuous holes across the thickness thereof, so that the noise carried by the gas flowing in the gas passage 3 is suppressed both by the absorption at the noise-absorbing partition 2 and by resonance at the noise-absorbing space 5 adjacent the gas passage 3. More particularly, the inside of the noise-absorbing space 5 is divided by the noise-shielding sectional walls 6 into a plurality of gas chambers $5a$, $5b$, ..., $5z$ aligned along the line of gas flow through the duct 1, so that the noise entering each of the gas chambers $5a$, $5b$, ..., $5z$ is reflected by the noise-shielding sectional walls 6 and prevented from propagating to the outlet of the duct 1, and the reflected noise is absorbed again by the noise-absorbing partition 2. Whereby, excellent noise reduction is achieved over a wide range of frequency.

Figure 4:
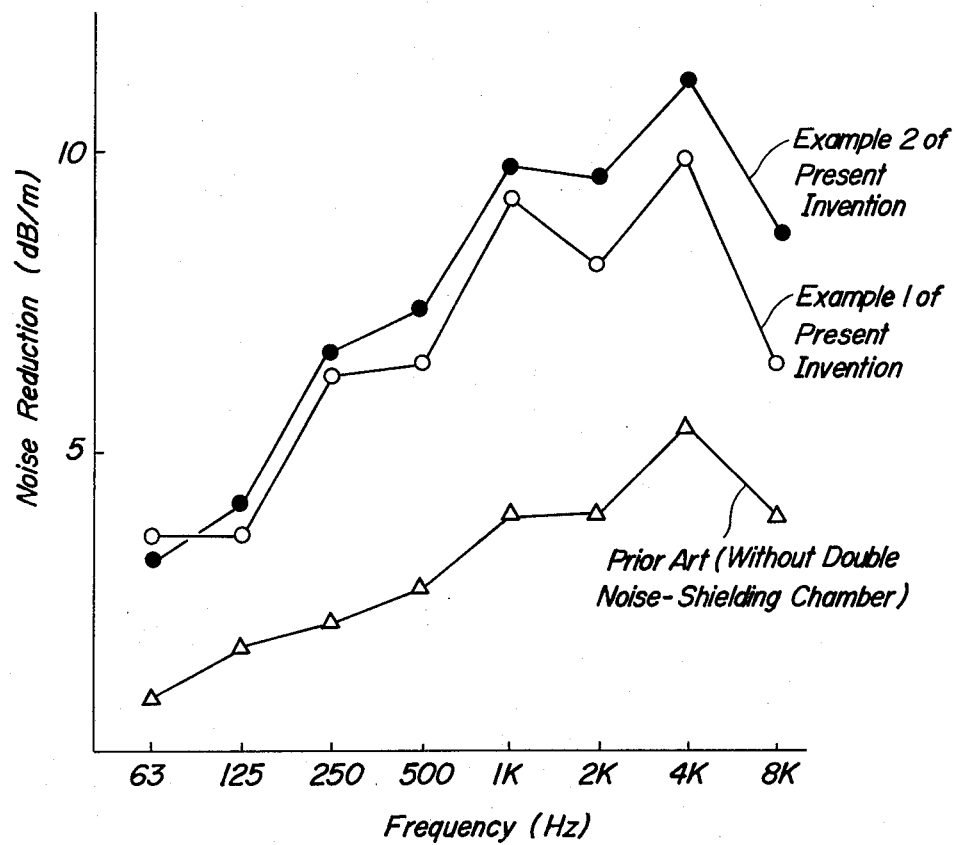
FIG. 4 is a graph which compares noise-suppressing characteristics of silencer of the prior art and that of the present invention.

FIG. 4 is a graph showing the results of tests carried out on Example 1 of the silencer of the present invention and a silencer of the prior art. As can be seen from FIG. 4, it was confirmed that the provision of the noise-shielding sectional walls 6 alone doubled the noise reduction, as compared with the prior art. Thus, the invention provides the advantage of allowing the use of a shorter silencer of the duct 1 for achieving a given noise reduction as compared with the prior art, so as to allow size reduction of the duct and the silencer. The number and the individual lengths of the gas chambers $5a$, $5b$, ..., $5z$ to be formed in the noise-absorbing space 5 can be selected depending on the needs of specific application, and if the lengths of the gas chambers $5a$, $5b$, ..., $5z$ are selected such that the length of the gas chamber $5z$ at the outlet of the duct 1 is the longer than that of the gas chamber $5a$ at the inlet of the duct 1, high noise suppression is achieved at the inlet of the gas flow to improve the overall noise-suppressing effect and to allow the use of a smaller number of the noise-shielding sectional walls 6. Besides, the use of the plurality of the gas chambers results in suppression of noises of different frequencies at gas chambers of different lengths in an effective manner. FIG. 4 also shows the result of tests on Example 2 of the silencer according to the present invention.

Most preferable noise-absorbing partition 2 to be used in the silencer of the present invention is formed of porous ceramic plates with innumerable minute holes across thickness thereof. The silencer of the present invention can be applied not only to the flow of clean gas but also to the flow of inlet gas or exhaust gas in chemical plants or the like where the gas may be at a high temperature or fed at a high flow rate or may contain corrosive gases or a large amount of dust particles, so that the silencer may be exposed to the risk of quick deterioration such as accelerated ageing, breakage, corrosion, or plugging of the noise-absorbing members. This quick deterioration leads to loss of the noise-absorbing capability after only a short period of service. The aforesaid porous ceramic plates have a high resistance to such deterioration due to gas flows in the chemical plants or the like, so that ceramic plates provide a highly durable silencer.

The porous ceramic plate to be used in the silencer of the invention can be made for instance by binding solid ceramic particles with a suitable binder such as water glass or shaping a mixture of ceramic slurry and sawdust into a body and firing the thus bound or shaped body. Since the aforesaid noise-absorbing partition 2 is difficult to make in one piece of porous ceramic plate, it is preferable to form such noise-absorbing partition 2 by assembling a plurality of preformed ceramic plates of suitable size into a unit panel. The individual preformed ceramic plate may have dimensions of 30(width)×30(length)×2(thickness) cm. Referring to FIG. 5, the preformed ceramic plate may be assembled by using a frame member 8 made of suitable anti-corrosive metal such as stainless steel.

The noise-shielding sectional wall 6 to be used in the silencer of the present invention must have suitable strength and noise-shielding capability, and such wall 6 can be made for instance by a metal plate, an asbestos slate, or a concrete board. Referring to FIG. 6, the noise-absorbing partition 2 such as the porous ceramic plate may be secured to skeleton members which skeleton members are premounted in a duct 1. If the skeleton member is a formed metal section 9 for forming structures, such as a metal section having sectional dimensions of 50(side)×300(web)×50(side)×2(thickness)mm, the short sides $9a$ of the metal section 9 can be used for securing the noise-absorbing partitions 2 while the web $9b$ of the metal section 9 can be used as the noise-shielding sectional wall 6. In this case, the metal section 9 may have projections extending from the two free ends of the sides $9a$ toward each other in parallel with the web $9b$, so as to have a cross section of partially open rectangular shape.

The silencer made by using the aforesaid formed metal section is easy to construct, because mounting of separate noise-shielding sectional walls can be dispensed with. Besides, such silencer with the formed metal sections is highly durable, so that the use of the formed metal sections in the silencer is preferable.

Although not shown in the drawings, the shape of the gas passage 3 can be modified so as to further improve the noise suppression, provided that the resistance against gas flow therein remains within allowable limits; for instance, the gas passage 3 may be bent in a zigzag fashion, undulations may be formed on sidewalls of the gas passage 3, or the spacing between the opposing noise-absorbing partitions 2, 2 may be decreased as the gas passage 3 extends toward the outlet of the duct 1. When a plurality of ducts 1 are used, the noise suppression may be further enhanced by providing a certain spacing between gas outlet of the gas passage 3 of one duct 1 and gas inlet of the gas passage 3 of another duct 1.

As described in the foregoing by referring to preferred embodiments, the present invention greatly improves the noise-suppressing effect of a silencer over a wide frequency range by disposing noise-absorbing partition means in a duct so as to define gas passage means and a noise-absorbing space means therein and dividing the noise-absorbing space means into a plurality of gas chambers aligned along the line of gas flow through the duct. Thus, the silencer of the present invention obviates the shortcoming of the prior art and yet is simple in construction and can be produced at a low cost, so that the silencer of the present invention is very useful for various purposes.

Although the invention has been described to a certain extent of particularity, it is understood that the present disclosure has been made only by way of example and that numerous changes in details of construction and the combination and arrangement of parts may be resorted to without departing from the scope of the invention as hereinafter claimed.

What is claimed is:

1. A silencer for an intake/exhaust gas duct having a duct casing wall defining an inside space over the entire length thereof with inlet and outlet openings, said silencer comprising noise-absorbing partition means extending through said inside space over the entire length of said gas duct in parallel with but spaced from said duct casing wall, said noise-absorbing partition means comprising a plurality of porous ceramic plates assembled side by side, said ceramic plates being provided with a plurality of minute apertures extending across the thickness of said plates; gas passage means extending in said inside space from said inlet opening to said outlet opening, said gas passage means having a sidewall, at least a major portion of said sidewall being said ceramic plates; noise-absorbing space means defined in said inside space adjacent said gas passage means with said noise-absorbing partition means disposed therebetween, said noise-absorbing space means being free of noise-absorbing material; noise-shielding plates disposed at inlet and outlet openings of said gas duct so as to close said noise-absorbing space means; and a plurality of gas chambers defined in said noise-absorbing space means by a plurality of noise-shielding sectional walls disposed in said noise-absorbing space means.

2. A silencer as set forth in claim 1, wherein said gas chambers become larger as said gas duct extends from said inlet opening toward said outlet opening.

3. A silencer as set forth in claim 1, wherein each of said noise-shielding sectional walls is a web portion of a metal section, which metal section has said web portion and side portions at right angles to said web portion, said side portions being secured to said duct casing and said noise-absorbing partition means.

4. A silencer as set forth in claim 3, wherein said metal section has projections extending from those ends of said side portions which are away from said web portion, said projections of each metal section extending toward each other substantially in parallel to said web portion.

* * * * *